C. L. PENNELL.
TRACTION WHEEL CLEAT MECHANISM.
APPLICATION FILED MAY 15, 1919.
1,373,203.
Patented Mar. 29, 1921.
2 SHEETS—SHEET 1.
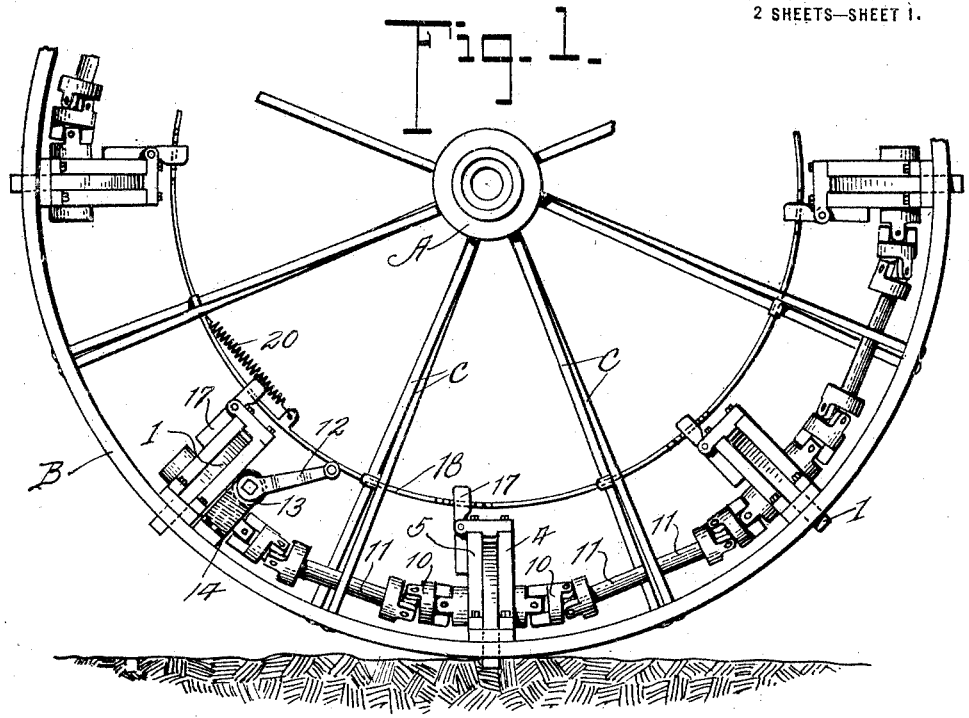
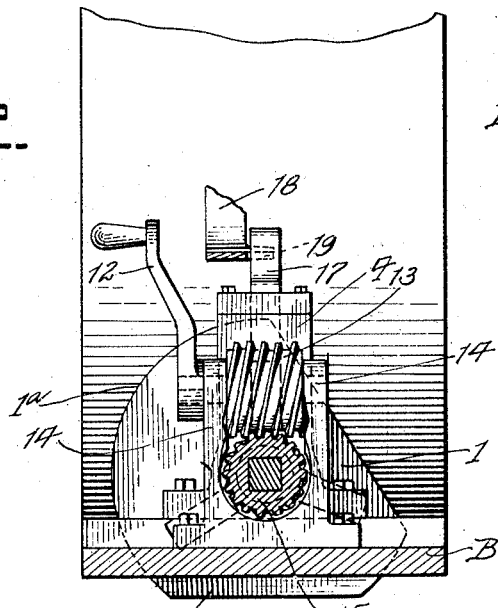
Witness
C. H. Wagner
Inventor
C. L. Pennell
By Robert Robb
Attorneys C. L. PENNELL.
TRACTION WHEEL CLEAT MECHANISM.
APPLICATION FILED MAY 15, 1919.
1,373,203.
Patented Mar. 29, 1921.
2 SHEETS—SHEET 2.
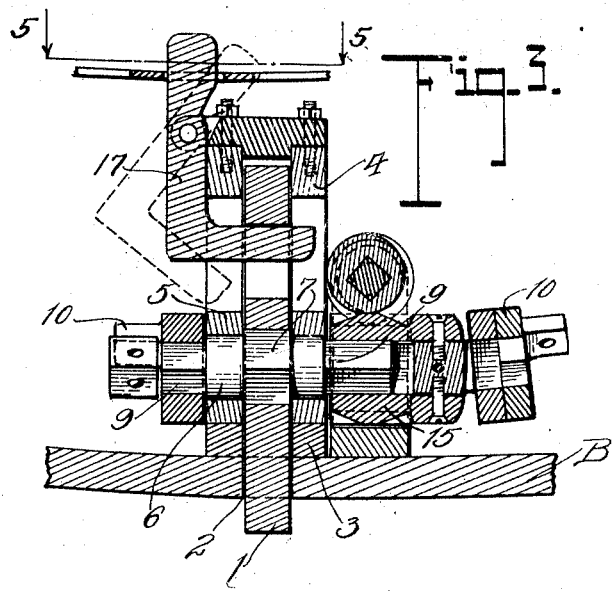
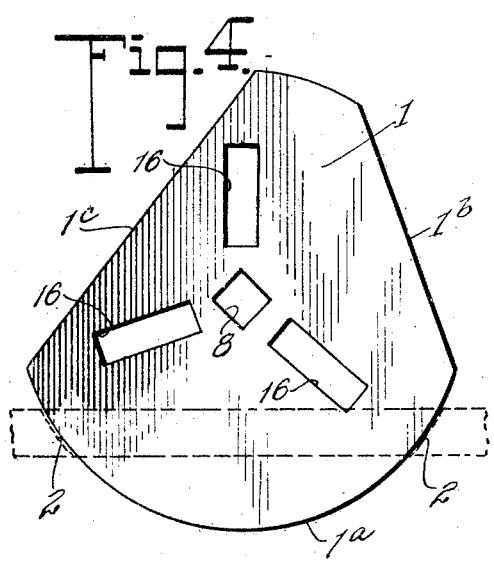
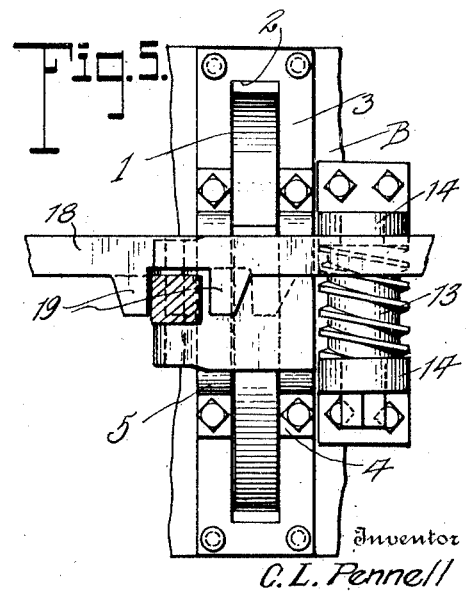
Witness
C. H. Wagner
Inventor
C. L. Pennell
By Robert Robb
Attorneys

UNITED STATES PATENT OFFICE.

CHARLES L. PENNELL, OF BARRS MILLS, OHIO.

TRACTION-WHEEL CLEAT MECHANISM.

1,373,203.  Specification of Letters Patent.  Patented Mar. 29, 1921.

Application filed May 15, 1919. Serial No. 297,180.

*To all whom it may concern:*

Be it known that I, CHARLES L. PENNELL, a citizen of the United States, residing at Barrs Mills, in the county of Tuscarawas and State of Ohio, have invented certain new and useful Improvements in Traction-Wheel Cleat Mechanism, of which the following is a specification.

This invention appertains to wheels of traction engines, harvesters, and heavy traction vehicles generally, of the type wherein the wheels are equipped with cleats or projections for obtaining desired traction with the surface over which the vehicle travels.

Among the various novel features of my invention are the following provisions: First, I utilize a novel form of rotatable or adjustable cleat having a plurality of traction elements coöperative with the rim of the wheel to project or not project from the latter according to the requirements of service. Secondly, I contemplate the provision of novel operating means for a plurality of such cleats or projections, said means including a shaft running circumferentially of the rim or tread of the wheel and manually operable whenever desired by the provision of a suitable device for this purpose. Thirdly, I employ peculiar locking contrivances for the various cleats or projections whereby the latter are locked in any one of their selective adjusted positions, and whereby they may be released at will; together with special means for operating the locking devices or contrivances from a point of common actuation.

In addition to the foregoing I have devised other and specific features of construction of traction means of the class set forth, an understanding of which, together with the features above especially mentioned, will be had on reference to the following description and to the accompanying drawings in which:

Figure 1 is a fragmentary side elevation of a traction wheel of any conventional type, equipped with the cleats or projections of my invention and their locking and operating mechanisms;

Fig. 2 is a cross section through the rim of the wheel showing more clearly the operating crank and worm gear mechanism;

Fig. 3 is a sectional view taken transversely through the parts shown in Fig. 2;

Fig. 4 is a view showing the cleat in elevation, dotted lines indicating the rim of the wheel;

Fig. 5 is a sectional view taken on the line 5—5 of Fig. 3;

Fig. 6 is a fragmentary plan view showing a modified arrangement of the cleats.

The traction wheel which I have illustrated in my drawings is a conventional type comprising the customary hub A, rim or tread B, and spoke C, the latter crossing one another intermediate their ends and being attached to the rim of the wheel at spaced points transversely of said rim.

By reason of the arrangement of the spokes C I am enabled to employ cleats and supporting means at intervals on the inside of the rim B, between the spokes, and a continuous operating device such as a jointed sectional shaft, or flexible shaft, connected with the cleats for turning them for adjustment purposes and extending circumferentially of the rim between the outer ends of adjacent pairs of spokes.

In the drawings, 1 denotes my cleat which is a rotary member or projection of somewhat disk-like form. As seen in Fig. 4 to best advantage the disk or cleat 1 is so adjusted relatively to the rim as to provide a curve traction element 1$^a$, the straight traction element 1$^b$ being inactive, though in Fig. 2 said element is illustrated as projected and operative. The member 1 has a third straight edge portion 1$^c$, which when operative occupies substantially the space of the opening in the rim B from which the cleat 1 is adapted to be projected. It is contemplated that the rim openings, designated 2, shall be cast or otherwise suitably formed in the rim B, and it will be evident from Fig. 4 of the drawings that by turning the cleat 1 in one direction the traction element or edge portion 1$^b$ will be projected and the element 1$^a$ withdrawn, or by turning the cleat in the other direction the element 1$^a$ will be withdrawn from its projected position and the element or edge 1$^c$ will be positioned at the opening 2 substantially closing said opening in an obvious manner.

The cleat 1, or cleats, for of course I provide said cleats in a series, one series preferably for half the periphery of the wheel, and the second series for the other half, are operated by sectional shafting, seen best in Figs. 1 and 3. For each cleat a support is provided comprising a reinforcing plate 3 riveted or otherwise fastened to the inside of the rim B, and spaced brackets 4 and 5 carried by said plate 3. The cleat 1 is disposed between the brackets 4 and 5 and is mounted upon a stub shaft 6 having an intermediate poly-sided portion 7 engaging a poly-sided opening 8 in the cleat, portions of the shaft 6 on opposite sides of the part 7 forming bearings journaled in openings in the brackets 4 and 5.

The ends of the stub shafts 6 are provided with square or poly-sided portions 9 to which are connected universal couplings 10, seen best in Fig. 1, said couplings connecting shaft sections 11 of the main sectional shaft one of which I provide preferably on each half portion of the wheel to operate the cleats carried by that particular portion.

One of the stub shafts 6, preferably that near the end of the main sectional shaft is equipped with means for facilitating the turning of the shaft consisting of a crank handle actuating mechanism. The actuating mechanism includes the removable crank handle 12 engageable with the worm 13 mounted in suitable brackets 14 alongside one of the brackets 4, said worm 13 engaging a worm gear 15 carried by one end of the stub shaft 6 adjacent thereto. The manner in which the devices just set forth operate the sectional shaft connected to the several cleats 1 is obvious, and when not in use, the crank 12 may be removed.

Each cleat 1 is provided with a series of openings 16 adapted to be engaged by a locking member 17, see Fig. 3, pivotally mounted on the support for the cleat. At its outer end the locking member 17 is engaged by a releasing or actuating member 18 in the form of a flat metal strip preferably, though not necessarily, the member 18 having lugs, see Fig. 5, designated 19 engaging the free end of said locking member. Obviously movement of the release member 18 in one direction will simultaneously unlock the cleats 1, and the spring 20 is connected to the member 18 to normally retract the same to a position tending to maintain the locking members 17 engaged with their respective cleats. I may use one or two or any suitable number of the members 18, for the various locking members of the wheel, but one would be entirely sufficient for practical purposes.

Fig. 6 illustrates a staggered arrangement of cleats which I may employ if desired. It will be obvious that flexible shafting might be substituted for the jointed sectional shafting shown by me in my drawings. Fig. 1, furthermore, illustrates how the sections 11 of the main shaft are adapted to operate between the ends of the spokes of the wheel.

It is to be understood that I do not wish to be limited to the exact details of construction illustrated by me as certain embodiments of my adjustable cleat, operating and locking mechanisms, said embodiments being susceptible of a large number of variations that would be practical for the purposes thereof. If desired, one of the traction edges of the cleat 1 may be provided with spikes or diggers of pointed form such as well known in the art of traction wheels. Furthermore, by uncoupling shaft sections 11 from adjacent universal joints 10 any one of the cleats 1 may be individually adjusted, removed, replaced, or otherwise handled.

Having thus described my invention, what I claim as new is:—

1. In a traction wheel, comprising a rim, a series of transversely rotative cleats at intervals on said rim, and operating means for said cleats arranged circumferentially of the rim for simultaneously adjusting said cleats to projected or non-projected positions.

2. In a traction wheel, comprising a rim, a series of cleats at intervals on said rim, and operating means consisting of shafting running circumferentially of the rim and connected to said cleats to turn the same, to project them and withdraw them relatively to the rim.

3. In a traction wheel, comprising a rim, a series of cleats at intervals on said rim, operating means for said cleats, locking devices for said cleats, and means common to the locking devices for actuating the same.

4. In a traction wheel, comprising a rim, a series of cleats at intervals on said rim, operating means for said cleats, locking devices for said cleats, and means common to the locking devices for actuating the same, the said operating means being connected to a plurality of the cleats and extending circumferentially of the rim, together with means coöperating with the actuating means for the locking devices to normally hold the latter in a predetermined position.

5. In a traction wheel, comprising a rim, a series of cleats at intervals on said rim, operating means for said cleats, locking devices for said cleats, means common to the locking devices for actuating the same, and spring means connected to said common means for maintaining the same in a position holding the locking devices operative.

6. In a traction wheel, the combination with the rim of said wheel, of a series of cleats arranged transversely of the rim at intervals thereon, sectional shafting connecting said cleats and disposed circumferentially of the rim at the inner side thereof, a manual device for actuating said shafting, a support for each cleat comprising spaced brackets between which the cleat is mounted, the shafting including a stud shaft for each cleat mounted in the support of the latter, locking devices mounted on the supports of the cleats to engage the cleats and hold them adjusted to projecting or non-projecting positions, and a common actuating means for said locking devices.

In testimony whereof I affix my signature.

CHARLES L. PENNELL.